United States Patent Office 3,386,935
Patented June 4, 1968

3,386,935
HIGH MODULUS POLYESTER AND POLY-
CARBONATE COMPOSITIONS
Winston J. Jackson, Jr., and John R. Caldwell, Kingsport,
Tenn., assignors to Eastman Kodak Company, Rochester, N.Y., a corporation of New Jersey
No Drawing. Continuation-in-part of application Ser. No. 445,686, Apr. 5, 1965, which is a continuation-in-part of application Ser. No. 137,979, Sept. 14, 1961, now Patent No. 3,254,047, dated May 31, 1966. This application June 29, 1966, Ser. No. 561,370
3 Claims. (Cl. 260—26)

This application is a continuation-in-part of our copending application Ser. No. 445,686 filed Apr. 5, 1965 which in turn is a continuation-in-part of copending application, Ser. No. 137,979 filed Sept. 14, 1961, now U.S. Patent 3,254,047. This application is also a continuation-in-part of copending application 372,093, filed June 2, 1963.

This invention relates to an improvement in thermoplastic compositions prepared from aromatic dihydroxy compounds and more particularly it relates to polycarbonate or polyester compositions which have been modified to increase the modulus elasticity of said compositions.

For certain film applications, including magnetic tape base, photographic film base, and packaging material, relatively stiff films are required, that is, films with high tensile modulus. For certain fiber applications, including various types of fabrics for wearing apparel, draper material, and upholstery relatively stiff fibers are required, that is fibers with a high tensile or elastic modulus. Likewise, high tensile or elastic modulus is desirable where the thermoplastic composition is molded into shaped objects. Although polyesters and polycarbonates have many properties desirable for such applications, they generally have relatively low moduli which drastically limits their utility.

The principal objects of the invention are: to provide new, highly useful polyester and polycarbonate compositions which can be transformed into film, fibers, and shaped objects having high heat-distortion temperatures, melting points, hardness, and substantially improved tensile moduli; and to provide a commercially practical process for preparing such films, fibers, and shaped objects.

These and other objects hereinafter appearing have been achieved in a general sense in accordance with the present invention through the discovery that high modulus is obtained by forming compositions of the polyesters and polycarbonates modified with materials which will be referred to as antiplasticizers. The antiplasticizers increase the modulus, tensile strength, and hardness of a thermoplastic composition and lower the elongation whereas a plasticizer decreases the modulus, tensile strength, and hardness of the thermoplastic composition and increases the elongation. In general antiplasticizers which have been found to be effective for polyesters and polycarbonates are polar compounds which contains at least one atom selected from the group consisting of halogen, oxygen, nitrogen, and sulfur and wherein said polar compound contains at least two non-bridged rings containing from four to eight atoms wherein rings are either carbocyclic rings or heterocyclic rings, and wherein said polar compound has in at least 65% of the length of its molecule one dimension less than about 5.5 Angstrom units, and wherein said polar compound has a glass transition temperature greater than −50° C. In general, the increase in modulus of a polyester or polycarbonate composition is obtained by providing a homogeneous mixture consisting of about 98% to about 50% and preferably from about 90% to about 70% by weight of a polycarbonate or a polyester and from about 2% to about 50% and preferably between about 10% and about 30% by weight of the antiplasticizers of this invention. The resulting thermoplastic composition can then be extruded, solvent-cast into a film, spun into fibers or filaments, or molded into a shaped object. When compared to compositions containing no antiplasticizer according to this invention, the polyesters and polycarbonates compositions of this invention have higher moduli and increased tensile strengths. Surprisingly, higher tear strengths have also been observed in many of the films which were formed from these respective polymers. Normally it is expected that a stiffening agent would lower the tear strength. Also, the antiplasticizers substantially lower the molding temperature of the plastics by lowering the melt viscosities. This is particularly advantageous as it is difficult to injection mold many polycarbonates and polyesters because of the high temperatures required to achieve the necessary flow properties in a molding operation.

A more specific disclosure of the types of polycarbonates and polyesters which can be modified with antiplasticizers will be disclosed below. However, it will be understood that the examples disclosed are included merely for purposes of illustration and are not intended to limit the scope of the invention unless otherwise specifically indicated.

Polycarbonates

The polycarbonates which are suitable for use in this invention are those which have inherent viscosities of at least 0.4 and which contain the residue of at least one aromatic dihydroxy compound. Preferably, these polycarbonates are prepared from bisphenols such as the aliphatic and the cycloaliphatic bisphenols described in Schnell, Angew, Chem., 68, No. 20 (1956), 633–660 and the polycyclic bisphenols described by Jackson and Caldwell in Ind. Chem. Prod. Res. and Develop. 2, 246 (1963).

In addition to containing the residue of at least one aromatic dihydroxy compound, these polycarbonates also may contain the modifying residue —O—R—O— of one or more diols wherein R may be alkyl, alicyclic, aryl, or a combination thereof. The diols may be employed as such in the main condensation reaction or first converted to a bischloroformate. Such alkyl diols may be straight or branched and may contain from 2 to 20 carbon atoms. Representative diols include ethylene glycol, 2,2-dimethyl-1,3-propanediol, and 1,10-decanediol. Diols containing cyclic groups include 1,4-cyclohexanediol, 1,4-cyclohexanedimethanol, 2,5-norbornanediol, and p-xylenealpha, alpha'-diol. Other diols are given below in the description of bischloroformate reactants.

The polycarbonates from bisphenols may be prepared by adding phosgene and/or a bischloroformate of a diol, to a cooled, stirred aqueous mixture containing sodium hydroxide, the bisphenol, and modifying diols, catalyst, and methylene chloride phase.

A bisphenol (residue shown by —O—B—O—) and phosgene give recurring structural units in the polymer of:

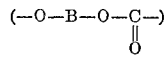

A bisphenol and a bischloroformate of a diol (residue shown by

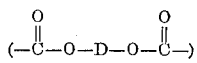

give recurring structural units of:

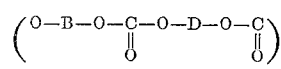

The diol from which the bischloroformate is prepared may be aromatic, aliphatic, or alicyclic, and may be primary, secondary, or tertiary. The carbon chain of aliphatic diols may be straight, or branched and may contain from 2 to 20 carbon atoms. Examples of diols are ethylene glycol; 1,6-hexanediol; 2,5-norbornanediol; trans-1,4-cyclohexanediol; 2,5 - dimethyl - 2,5 - hexanediol; hydroquinone, and 4,4'-isopropylidenediphenol. Also any of the following groups may be present in the molecule (R=alkyl or aryl): —R$_2$C—, —O—, —OCH$_2$CH$_2$O—, —S—, —SO—, —SO$_2$—, —SO$_2$NR—, —NR—, —CONH—, —CO—, —COO—, —CF$_2$, —NRNR—, —CH=CH—, —C≡C—, phenylene, cyclohexylene, etc.

Bischloroformates of aliphatic and alicyclic diols may be prepared by adding an excess of phosgene to the diol suspended in ethylene dichloride. If the diol reacts very slowly, some dry dioxane is also added to increase its solubility in the medium. After all of the diol has been dissolved, dry air is passed in until all of the hydrogen chloride and excess phosgene has been swept out. The bischloroformate solution may then be used as needed in the polymerization reactions.

Bischloroformates of aromatic diols, including bisphenols, may be prepared by simultaneously adding the diol (dissolved in dioxane) and dimethylaniline to a stirred solution of phosgene in toluene. A similar procedure is described in British Patent 613,280.

When a bischloroformate is added to the reaction mixture, the molar amount of the bisphenol preferably should be equal or in slight excess (5 mole percent). When phosgene and a bischloroformate are both added, or the phosgene alone is used, the phosgene preferably should be 5 to 10 mole percent in excess of its equivalent bisphenol in the reaction mixture. A quaternary ammonium salt or hydroxide increases the rate of polymerization. This may also be accomplished with certain tertiary amines, such as tri-n-butyl amine, which is preferred. The optimum temperature range is 15–25° C. At lower temperatures a longer reaction time is required. At higher temperatures hydrolysis tends to lower the inherent viscosity of the polymer product. Depending upon the catalyst used, the normal reaction time required to obtain a maximum molecular weight product may vary from 10 minutes to 2 hours. The reaction rate is slower if impure reactants or if no catalyst is used. Longer reaction times permit polymer hydrolysis which tends to lower its molecular weight. At the end of the reaction time the alkali present must be neutralized with acetic, hydrochloric, or other acid.

After the reaction is completed, the polymer layer is diluted by adding methylene chloride and then is washed thoroughly with water. The polymer can be precipitated by slowly pouring the methylene chloride phase into methanol, hexane, or other non-solvent.

In addition to the interfacial process just described for preparing the polycarbonates of this invention, these polymers may also be prepared by adding phosgene and/or a diol bischloroformate to a stirred mixture containing the bisphenol and a tertiary amine, such as pyridine or triethylamine. A portion of the tertiary amine may be replaced with a solvent for the polymers, such as methylene chloride. In contrast to the interfacial process, in this process it is not necessary to add nonaromatic diols in the form of their bischloroformates—the diols themselves may be added. Copolycarbonates are then obtained when phosgene is added to the bisphenol/diol mixture in the tertiary amine.

These polycarbonates also may be prepared by the ester interchange process, that is, by heating the bisphenol, a diaryl carbonate, and a suitable catalyst under reduced pressure. Satisfactory diaryl carbonates include diphenyl carbonate, ditolyl carbonate, dixylyl carbonate, and dinitrophenyl carbonate. Catalysts include the oxides, hydrides, and hydroxides of alkali metals and alkaline earth metals and also the free alkali and alkaline earth metals. Other suitable catalysts include butyl lithium, phenyl lithium, zinc oxide, lead oxide, dibutyltin oxide, and sodium aluminate. The usual method is followed of heating the reactants under reduced pressure to remove the phenolic compound as the condensation proceeds. Required temperatures are 250°–350° C. It is preferred to build up final molecular weight by the solid-phase process in which the granulated polymer is heated under reduced pressure (preferably below 1 mm. of mercury) at a temperature somewhat below its melting point.

The polycarbonates of this invention also include copolycarbonates prepared, for example, by condensing more than one bisphenol with either phosgene, a diol bischloroformate or a diaryl carbonate, or by condensing a mixture of a bisphenol and two or more diol bischloroformates. Block copolycarbonates are prepared by condensing a mixture of low-molecular-weight homopolycarbonates with phosgene. Mixed copolymers are prepared by condensing a bisphenol with a bischloroformate of a polymeric diol (e.g., polyethylene oxide bischloroformate). Further explanation of various polycarbonate preparations is contained in copending U.S. application, Ser. No. 292,139, filed July 1, 1963.

Polyesters

The polyesters, which are suitable for use in this invention, are those that have relatively rigid chains and are prepared from cyclic intermediates such as the alicyclic secondary diols and dicarboxylic acids such as the aromatic dicarboxylic acids, the alicyclic dicarboxylic acids, carbonic acid and the esterifiable derivatives of these acids.

Polyesters prepared from primary diols do not exhibit the improved moduli properties when the antiplasticizers of this invention are blended therewith. Apparently the primary diols give the respective polymer too much flexibility and, thus, do not result in a composition having higher moduli when used in accordance with this invention.

The secondary alicyclic diols may be monocyclic or polycyclic and may contain from 4 to 14 carbon atoms. Examples are 1,3-cyclobutanediol, 2,2,4,4-tetramethyl-1,3-cyclobutanediol, 2,4 - dibutyl-2,4-diethyl-1,3-cyclobutanediol, 1,3-cyclopentanediol, 1,3-cyclohexanediol, 1,4-cyclohexanediol, 1,5-cyclooctanediol, 2,5-norbornanediol (I), decahydro-1,4:5, 8-dimethanonaphthalene-2, 6-diol (II), dispiro(4.1.4.1) dodecane-6, 12-diol (III), and dispiro (5.1.5.1)tetradecane-7, 14-diol (IV). The latter four polycyclic compounds have the following structures:

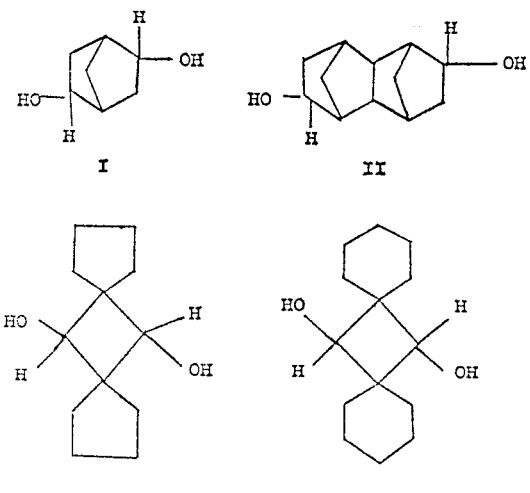

Aromatic dicarboxylic acids used in preparing the polyesters may contain from 8 to 16 carbon atoms and may contain one or more aromatic rings. Examples are terephthalic acid, isophthalic acid, phthalic acid, 1,4-naphthalenedicarboxylic acid, 2,6-naphthalenedicarboxylic acid, 4,4'-diphenic acid, 4,4'-methylenedibenzoic acid, and 4,4'-sulfonyldibenzoic acid.

Alicyclic dicarboxylic acids used in preparing the polyesters may contain from 6 to 16 carbon atoms and may be monocyclic or polycyclic. Examples include 1,3-cyclobutanedicarboxylic acid, 1,3-cyclopentanedicarboxylic acid, 2,5-norbornanedicarboxylic acid, and decahydro-1,4:5, 8-dimethanonaphthalene-2,6-dicarboxylic acid.

It is well known that in the preparation of polyesters the diol may be condensed with derivatives of dicarboxylic acids through the ester interchange as well as with the acids themselves. Those compounds which can be used in the preparation of polyesters as functionally equivalent substitutes for dicarboxylic acids are intended to be included within the term, "esterifiable derivatives." These derivatives include dicarboxylic acid esters, such as the dimethyl ester of terephthalic acid and the dibutyl ester of 4,4'-sulfonyldibenzoic acid; the dicarboxylic acid halides such as terephthaloyl chloride and 1,3-cyclohexanedicarbonyl chloride; and other suitable substitutes for dicarboxylic acids.

The polyesters of this invention also include copolyesters and block polyesters. They may be prepared from more than one diol or dicarboxylic acid. Up to 20 weight percent of the polymer may contain units derived from an aliphatic diol or dicarboxylic acid.

All of the polyesters of this invention are prepared by conventional polyesterification methods. The preparation of one of the most desirable polyesters for use in this invention is one made from 2,2,4,4-tetramethyl-1,3-cyclobutanediol and is described in a copending patent application, Serial No. 860,375 filed by Elam, Martin, and Gilkey entitled, Linear Polyesters and Polyester-Amides from 2,2,4,4-Tetraalkyl-1,3-Cyclobutanediols.

Antiplasticizers

The antiplasticizers which are incorporated into the polyesters or polycarbonates to produce an increase in strength properties and in moduli are materials which, in general, are polar and which contain bulky structures with a relatively high degree of rigidity. These materials may be polymeric or monomeric and, preferably, are nonvolatile, thus inhibiting migration of the antiplasticizer from the plastic composition. The antiplasticizer must, of course, be compatible with the respective polycarbonate or polyester polymer. Antiplasticizers which are soluble to the extent of at least 5% by weight in methylene chloride at 20° C. are usually compatible with polycarbonates and polyesters. Moreover, a film of the respective polymer compositions containing the antiplasticizers is clear and transparent when the antiplasticizer is compatible with the plastic.

In general, compounds which will serve as antiplasticizer for the polycarbonate or polyester compositions of this invention are polar compounds which contain at least one atom selected from the group consisting of halogen, oxygen, nitrogen, and sulfur; they contain at least two non-bridged rings containing from 4 to 8 atoms wherein said rings are either carbocyclic or heterocyclic rings; they have in at least 65% of the length of the molecule one dimension less than about 5.5 angstrom units, and they have a glass transition temperature greater than −50° C.

The antiplasticizers which are useful for the polyesters and polycarbonates of this invention are all relatively rigid, polar compounds. When polar groups are not present in the molecules, considerably less stiffening of the polymer occurs, and the tensile strength is not appreciably increased. For example, when 20% of biphenyl was added to Bisphenol A polycarbonate the modulus was increased somewhat to $3.7 \times 10^5$ p.s.i., but the tensile strength was decreased. When 20% of biphenyl containing 54% chlorine was added the modulus was increased to $4.5 \times 10^5$ p.s.i. and the break strength was increased to 14,200 p.s.i. The effect of the polar groups on the respective compounds is demonstrated by the following data in Table I.

TABLE I.—EFFECT OF POLAR GROUP

| Additive [1] | Modulus $10^5$, p.s.i. | Tensile strength, p.s.i. |
|---|---|---|
| None | 3.0–3.3 | 8,500–9,000 |
| Biphenyl | 3.7 | 8,000 |
| Chlorinated biphenyl with 54% chlorine | 4.5 | 14,200 |
| 2,2'-dinitrobiphenyl | 4.4 | 12,000 |
| Polystyrene glycol m.w.=500 | 4.6 | 13,500 |
| Abietic acid, methyl ester | 4.7 | 12,700 |
| Dibutyl phthalate (plasticizer) | 3.0 | 7,000 |

[1] Additive was added to 4,4'-isopropylidene diphenol polycarbonate in conc. of 20%. Similar results were obtained with other polycarbonates and polyesters described herein.

In addition to being polar the antiplasticizers must be relatively thin molecules. The importance of the size in thickness of an antiplasticizer is demonstrated by the phthalate esters. Dimethyl and dibutyl phthalates, which contain only one ring, are plasticizers whereas dicyclohexyl and diphenyl phthalates, which are larger molecules with three rings, have an antiplasticizing effect. Upon inspection of Table II, it is apparent that dicyclohexyl phthalate is less effective as a antiplasticizer than diphenyl phthalate, but cyclohexyl groups are appreciably thicker than phenyl groups (5.1 angstroms vs. 2.7 angstrom according to Fisher-Hirschfelder-Taylor models). According to the film modulus, addition of tertiary octyl groups to the para position of the phenyl rings decreased the stiffening effect of the additive. The thickness of the octyl groups is 6.2 angstroms. The thick octyl group had a greater effect on the modulus when they were at each end of the molecule in the terephthalate diester instead of clustered on one side in the phthalate. The two octyl groups in the terephthlate constitute half the length of the molecule, and a film containing 20% of this additive had a modulus of only $3.2 \times 10^5$ p.s.i.

TABLE II.—EFFECT OF THICKNESS OF PHTHALATE ESTERS [1]

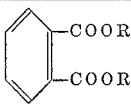

| | Tensile Properties | | | |
|---|---|---|---|---|
| R | Modulus, $10^5$ p.s.i. | Yield Strength, p.s.i. | Break Strength, p.s.i. | Elong. at Break, percent |
| | 3.0–3.3 | 8,500–9,000 | 9,000–9,500 | 20–90 |
| Methyl | 2.6 | 5,000 | 3,700 | 44 |
| Butyl | 3.0 | 7,500 | 7,100 | 21 |
| Cyclohexyl | 3.6 | 9,300 | 8,200 | 8 |
| p-C₆H₄—C(CH₃)₂—CH₂—C(CH₃)₃ | 3.7 | 11,000 | 9,700 | 11 |
| Phenyl | 3.9 | 9,500 | 9,000 | 10 |

[1] Phthalate was added to 4,4'-isopropylidene diphenol polycarbonate in conc. of 20%. Similar results were obtained with other polycarbonates and polyesters described herein.

Fisher-Hirschfelder-Taylor models indicated that antiplasticizers are inclusive of compounds wherein at least 65% of the length of the molecule had one cross sectional dimension less than about 5.5 Angstroms and over half of it is less than 5.0 Angstroms thick. However, as shown in Table I, abietic acid esters are quite effective as antiplasticizers. In contradistinction, bridged rings structures such as the norbornane derivatives do not show an effective antiplasticizing effect. Although some of the norbornane additives slightly increase the modulus of the films, the tensile strength was decreased in every instance. In fact, in most examples the modulus and the tensile strength was actually decreased when a norbornane derivative was used as an additive. Apparently thick molecules such as the norbornane derivatives, which contain a norbornane ring having a thickness of 6.5 Angstroms, push the polymer chain so far apart that the attractive forces between the chains are appreciably reduced. Consequently, the stiffness and tensile strength of the polymer are decreased.

The antiplasticizers must also have a relatively high degree of rigidity. Cyclic structures introduce rigidity into a molecule, and aromatic compounds are generally more effective antiplasticizers than saturated alicyclic compounds; aromatic rings are thinner than alicyclic rings. Molecules containing at least two rings are more effective antiplasticizers than molecules containing only one ring. For example, dialkyl phthalates are plasticizers as exemplified in Tables II and III.

TABLE III.—EFFECT OF RIGIDITY [1]

| Hydrocarbon | Modulus, $10^5$ p.s.i. | Break strength, p.s.i. |
| --- | --- | --- |
| None | 3.0–3.3 | 9,000–9,500 |
| Dibutyl phthalate | 3.0 | 7,000 |
| Pentachlorophenol | 3.6 | 8,000 |
| Dimethyl 2,3,5,6 tetrachloroterephthalate | 3.3 | |
| Chlorinated biphenyl, 54% Cl (2 ring-antiplasticizer) | 4.5 | 14,200 |

[1] Additive was added to 4,4′-isopropylidene diphenol polycarbonate in conc. of 20%. Similar results were obtained with other polycarbonates and polyesters described herein.

It is apparent from Table III that polar groups in themselves will not make a compound an antiplasticizer but that at least two rings impart the necessary rigidity to the molecule. The rings may be fused together, as in a phenanthrene nucleus, or they may be separated from one another as in diphenylsulfone. The rings may be carbocyclic or heterocyclic and may contain from 4 to 8 carbon atoms. To prevent the molecule from being too thick at least two of the rings must be non-bridged.

Note all thin, polar compounds containing at least two rings are antiplasticizers. Some, in fact, are plasticizers, e.g., dibenzyl succinate which contains a flexible group between the two phenyl rings. A more quantitative measure of the rigidity of the molecule, therefore, is required.

An indication of the rigidity of a molecule is given by its glass transition temperature. This may be determined for quenched, noncrystalline samples by differential thermal analysis, as described in J. Phys. Chem., 68, 1750 (1964). Quenching of the sample is achieved by heating above the melting point (if a solid) and then quickly cooling in liquid nitrogen. The glass transition temperatures of a number of additives are listed in Table IV, and it is significant that compounds with the lowest glass transition temperatures are plasticizers whereas those with the higher glass transition temperatures are antiplasticizers. The most effective antiplasticizers are the compounds with transition temperatures above −50° C. The effectiveness of the antiplasticizing action does not increase as the glass transition temperature increases, because the polarity and thickness of the molecule become the dominant factors.

TABLE IV.—GLASS TRANSITION TEMPERATURES OF ADDITIVES

| Additive: | Glass transition temperature, °C. |
| --- | --- |
| Di-n-octylphthalate | −87 |
| Diethylphthalate | −85 |
| Di(2-ethylhexyl)phthalate | −82 |
| Tri(o-cresyl)phosphate | −61 |
| Dibenzyl succinate | −58 |
| Abietic acid, methyl ester | −45 |
| Dicyclohexyl phthalate | −33 |
| Chlorinated biphenyl, 54% Cl | −29 |
| Hydrogenated abietic acid triethylene glycol ester | −28 |
| Diphenyl phthalate | −15 |
| Poly(styrene glycol), mol. wt. 500 | −10 |
| Chlorinated terephenyl, 42% Cl | 4 |
| Chlorinated terephenyl, 60% Cl | 55 |

In summary, an antiplasticizer for the polycarbonates and polyesters of this invention (1) contains at least one polar atom selected from the group consisting of halogen, oxygen, nitrogen, and sulfur, (2) contains at least two nonbridged rings containing from four to eight atoms and selected from the group consisting of carbocyclic and heterocyclic rings, (3) has in at least 65% of the length of its molecule one cross-sectional dimension less than about 5.5 angstroms units, and (4) has a glass transition temperature greater than −50° C.

The above examples are only exemplary of the effect of each limitation on the antiplasticizer and are not to be construed as limiting the scope of the invention. The characteristics of numerous other species of each class are set forth in the following tables which further demonstrate the type of compounds encompassed by the specified limitations for effective antiplasticizers.

The preferred classes of compounds which are within the above definition and have been found to be highly effective as antiplasticizers may be generally classified as follows:

(1) Polystyrene glycol
(2) Polystyrene thioglycol
(3) Chlorinated aromatic polynuclear hydrocarbons containing from 30% to 75% nuclear chlorine
(4) Esters of saturated and unsaturated abietic acid
(5) Abietyl alcohols, both saturated and unsaturated
(6) Esters of saturated and unsaturated abietyl alcohols.

Polystyrene glycol is intended to mean the diol of poly-(phenylethylene oxide):

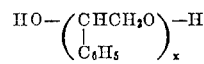

Polystyrene glycols having molecular weights from 378 to 3000 ($x=3$–25) are suitable as additives for increasing the modulus of plastic materials according to this invention.

Polystyrene thioglycol is a polymer from phenylethylene sulfide. It has the structure:

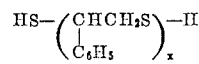

Thioglycol suitable for the invention range in molecular weight from 440 to 3400 ($x=3$–25).

Chlorinated aromatic polynuclear hydrocarbons containing 30% to 75% nuclear chlorine are excellent additives as antiplasticizers for polycarbonates or polyesters. This type is frequently preferred because the additive not only increases the modulus, but it may also provide fire-retardant properties. Types of aromatic polynuclear hydrocarbons which may be chlorinated for this purpose are diphenyl, the terphenyls (o, m, and p), naphthalene, phenanthrene, and anthracene. Also, chlorinated aromatic compounds with the following structures are effective:

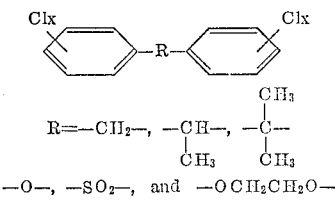

—O—, —SO₂—, and —OCH₂CH₂O—

Other antiplasticizers are the diabietates of aliphatic and cycloaliphatic diols containing from 2 to 20 carbon atoms. The aliphatic diols from which the diabietates are made may be straight-chain or branched. Aromatic or alicyclic groups may be present. Examples of these diols include 1,4-butanediols; 1,10-decanediols; 2,2-dimethylpropanediol; 2,2,4-trimethyl-1,3-pentanediol; 1,4-cyclohexanedimethanol; 1,4-alpha, alpha'-xylylenediol; 1,4-cyclohexanediol; 2,5-norcampanediol. Ether linkage may be present, as represented in diethyleneglycol, and tetraethyleneglycol. Polyhydroxy compounds containing from 3 to 15 carbon atoms can be used, such as glycerol or pentaerythritol. Diabietates may be prepared from unsaturated abietic acid or from hydrogenated abietic acid. Technical grades of abietic acid and rosin acids can be employed in preparing the glycol esters.

Monoesters of abietic or hydrogenated abietic acids and monohydroxy alcohols containing from about 1 to 20 carbon atoms are also useful as antiplasticizers. Typical alcohols are methanol, 2-ethylhexanol, cyclohexanol, 2-norcamphanol, and benzyl alcohol.

Abietyl alcohol and hydrogenated abietyl alcohol are suitable antiplasticizers for this invention. Hydrogenation of abietic acid and abietyl alcohol reduces the two double bonds in the compounds.

Esters from unsaturated and hydrogenated abietyl alcohols and mono- and diesters obtained from these two alcohols and mono- and dicarboxylic acids are also suitable antiplasticizers. Many of these esters are available commercially. Monocarboxylic acids suitable for making these esters are those containing from about 1 to 20 carbon atoms. Aliphatic chains in the acids may be straight or branched. Aromatic or alicyclic groups may be present. Examples of the acids include acetic, 2-ethylhexanoic, cyclohexanecarboxylic, 2-norcamphanecarboxylic, benzoic, and phenylacetic. Ether linkages may be present, such as in phenoxyacetic acid. Straight-chain or branched dicarboxylic acids may be used which contain from about 2 to 20 carbon atoms. Aromatic or alicyclic groups may be present. Examples of these acids include adipic, dimethylmalonic, 1,4-cyclohexanedicarboxylic, isophthalic, and 2,5-norcamphanedicarboxylic. Ether linkages may be present, such as in diglycolic acid.

The preferred antiplasticizers for polycarbonates and polyesters are: (1) chlorinated biphenyls and terphenyls comprising from about 30% to 75% chlorine; (2) poly(styrene-glycols) having a molecular weight of about 378 to about 1500; and (3) esters from the condensation of monohydroxy and polyhydroxy alcohols with unsaturated and hydrogenated abietic acids; abietyl alcohol; hydrogenated abietyl alcohol; and mono- and diesters from condensation of unsaturated and hydrogenated abietyl alcohols with monocarboxylic and dicarboxylic acids having up to 19 carbon atoms.

The amount of antiplasticizer which is added to the polycarbonate or the polyester in accordance with this invention may be from about 2% to about 50%, preferably from about 5% to about 30% by weight of the total composition. Due to the chemical differences between the polycarbonates and the polyesters, slightly different amounts of antiplasticizer may be necessary in order to accomplish substantially the same increase in strength properties or in the modulus of elasticity. In many embodiments of this invention it has been found necessary to employ slightly more antiplasticizer with a polycarbonate than with a polyester.

The antiplasticizer is conveniently added to the polymer by adding it to the polymer dope. The polymer may be dissolved in solvents such as the halogenated hydrocarbons, e.g., chloroform, methylene chloride, etc. The antiplasticizer is added to the polymer dope and the resulting mixture may be used in that form for fabrication into various shaped articles, or alternatively, the dope may be evaporated to form dry polymer particles, which in turn, may be molded or extruded into various shaped articles. Films are normally made by conventional solvent-casting techniques in which the polymer dope is spread on a flat surface, the solvent is evaporated, and the resulting material is stripped away from the surface in the form of a self-supporting film. Fibers are conveniently made by dry-spinning the dope. For example, materials of this invention can be converted to fibers by dry spinning through a 30-hole (0.075 mm.) spinneret into a chamber at 60–100° C. followed by drafting. If the polymer mixture is sufficiently insoluble in convenient solvent, films and fibers may be fabricated by extruding a dry-blended mixture of the dry polymer and the antiplasticizer.

An alternative procedure when the polymer is to be melt-spun, extruded, or molded is to dissolve the antiplasticizer in a solvent which does not dissolve nor appreciably swell the polymer. The solution of antiplasticizer is added to particles of the polymer (10 to 20-mesh or smaller in size) and the solvent is evaporated, leaving the antiplasticizer as a deposit on the polymer particles. Suitable solvents which will dissolve the antiplasticizers but not the polymers include acetone, methanol, ethanol, hexane, naptha, and cyclohexane.

Films and fibers may be oriented by stretching or drafting to enhance their properties even beyond those provided by the presence of the antiplasticizers. The polyesters and the polycarbonates may be crystalline or non-crystalline. In many applications, non-crystalline films are preferred because they are more transparent, while, on the other hand, crystalline fibers are frequently preferred because after drafting and heat-setting, they have higher tenacities and melting temperatures than non-crystalline fibers.

The effect of adding the antiplasticizer to the polycarbonates or the polyesters in accordance with this invention is to increase the tensile modulus (Young's Modulus), to increase the tensile strength at the break point, to decrease the percent elongation at the break point, and, normally, to decrease the heat-distortion temperature.

In addition to the preferred antiplasticizers mentioned on p. 19, which are readily available commercially, other antiplasticizers which illustrate our invention and fall within the above-mentioned antiplasticizer definition are structurally represented below. The structural formulas have been illustrated to provide a ready comparison with the formula. The respective compounds will hereinafter be referred to in Table VI and Table VI(A) by the identifying roman numeral adjacent the formula.

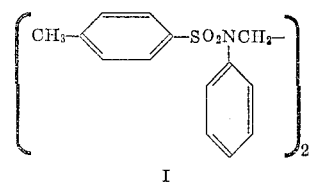

I

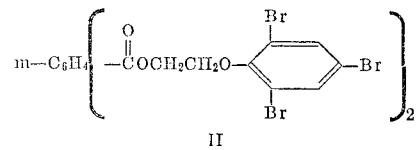

II

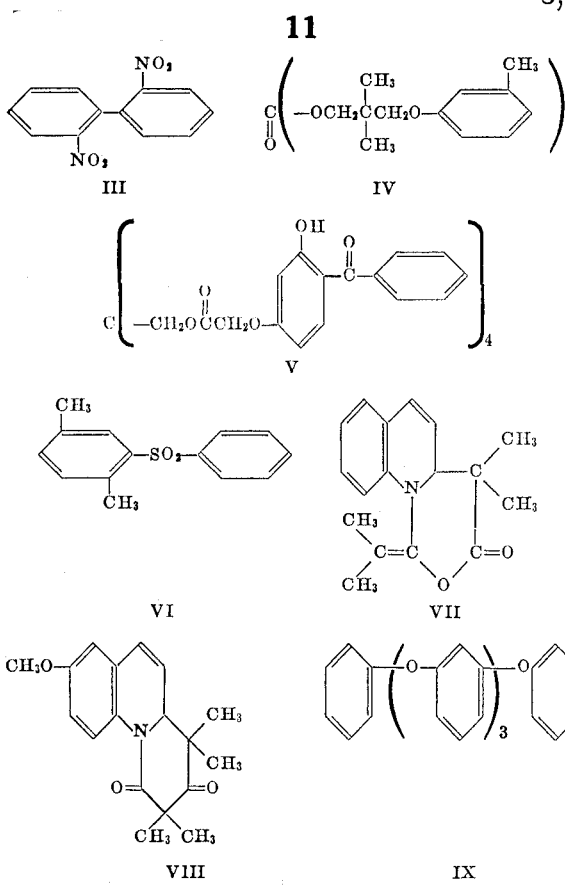

To illustrate the invention, several experiments were carried out in which various polycarbonates and polyesters were prepared and treated with many different antiplasticizers in different concentration ranges. The following examples are intended to be illustrative and not to be restrictive in any sense whatsoever.

Example I

A number of polycarbonates were prepared from the reactants specified in Table V. The polycarbonates were then mixed with various antiplasticizers and an organic solvent (methylene chloride) was used to prepare dopes from which films were cast. Films were similarly prepared from the polycarbonates without additives. Modulus of elasticity in tension (Young's Modulus, E) of each of the films, with and without additives, was measured and the results are compared below.

In Table V the polycarbonates were prepared from the specified components. The inherent viscosity of the polymer is also itemized.

TABLE V.—BISPHENOL POLYCARBONATES

Polycarbonates were prepared from:

(A) 4,4′-Isopropylidenediphenol (Bisphenol A) and phosgene, I.V. 1.01
(B) 4,4′-(2-Norbornylidene)diphenol and phosgene, I.V. 1.23
(C) 4,4′ - (Hexahydro - 4,7 - methanoindan-5-ylidene)-diphenol and phosgene, I.V. 0.87
(D) 4,4′ - (2 - Norbornylidene)bis(2,6-dichlorophenol) and phosgene, I.V. 1.83
(E) 4,4′ - (2,4,6-Trichloro-α-methylbenzylidene)diphenol and phosgene, I.V. 0.89
(F) Equimolar hydroquinone and 1,4-cyclohexanediol bischloroformate, I.V. 0.86

Table VI lists the various mixtures of polycarbonate and additive used for making the film. The number in column 1 identifies the respective polycarbonate having the corresponding number in Table V. In column 2 the additive is identified; additives identified by roman numerals are illustrated structurally above. In column 3 the weight percent of additive in the mixture is shown. In column 4 is shown the modulus of elasticity of a film of the polycarbonate-additive mixture, in column 5 is shown the break strength, and in column 6 is shown the elongation at break.

TABLE VI

| | Additive | Wt., percent | Modulus, 10⁵ p.s.i. | Break Strength, p.s.i. | Elongation at Break, percent |
|---|---|---|---|---|---|
| Polycarbonate: | | | | | |
| A | None | 0 | 3.0–3.3 | 9,000–9,500 | 20–90 |
| A | Dibutyl phthalate (plasticizer) | 20 | 3.0 | 7,000 | 14 |
| A | do | 30 | 2.5 | 5,800 | 122 |
| A | Dibenzyl sebacate (plasticizer) | 30 | 0.5 | 3,900 | 128 |
| A | Dibenzyl succinate (plasticizer) | 30 | 1.4 | 3,100 | 114 |
| A | Chlorinated biphenyl with 54% chlorine | 20 | 4.5 | 14,200 | 4 |
| A | do | 30 | 4.7 | 12,700 | 4 |
| A | Chlorinated biphenyl with 68% chlorine | 20 | 4.0 | 11,000 | 7 |
| A | do | 40 | 4.4 | 11,000 | 3 |
| A | Chlorinated terphenyl with 42% chlorine | 10 | 4.5 | 13,700 | 4 |
| A | do | 20 | 4.6 | 12,800 | 4 |
| A | Poly(styrene glycol) of mol. wt. 500 | 20 | 4.6 | 13,500 | 4 |
| A | Abietic acid, methyl ester | 20 | 4.7 | 12,700 | 4 |
| A | Hydrogenated abietic acid, triethylene glycol ester | 15 | 4.1 | 12,900 | 5 |
| A | Hydrogenated abietyl acetate | 20 | 4.4 | 13,100 | 4 |
| A | Compound I | 20 | 4.4 | 12,300 | 5 |
| A | Compound II | 20 | 4.4 | 12,700 | 5 |
| A | Compound III | 20 | 4.4 | 12,000 | 4 |
| A | Compound IV | 17 | 4.3 | 12,600 | 3 |
| A | Compound V | 20 | 4.3 | 13,500 | 4 |
| A | Compound VI | 20 | 4.2 | 9,700 | 15 |
| A | Compound VII | 20 | 4.3 | 12,700 | 5 |
| A | Compound VIII | 20 | 4.3 | 13,200 | 5 |
| B | None | 0 | 3.7 | 11,000 | 15 |
| B | Chlorinated terphenyl with 42% chlorine | 20 | 4.9 | 14,600 | 3 |
| B | Chlorinated diphenylmethane with 58% chlorine | 20 | 5.1 | 14,100 | 3 |
| B | Poly(styrene glycol) of mol. wt. 1,500 | 25 | 4.8 | 13,100 | 3 |
| B | Poly(styrene thioglycol) of mol. wt. 440 | 20 | 4.7 | 12,700 | 3 |
| B | Abietic acid, methyl ester | 20 | 4.9 | 12,500 | 3 |
| C | None | 0 | 3.5 | 11,200 | 10 |
| C | Chlorinated biphenyl with 42% chlorine | 20 | 4.0 | 12,000 | 3 |
| C | Chlorinated biphenyl with 54% chlorine | 5 | 3.9 | 11,300 | 4 |
| C | do | 10 | 4.4 | 13,000 | 4 |
| C | do | 20 | 4.9 | 13,600 | 4 |
| C | Chlorinated terphenyl with 42% chlorine | 20 | 4.8 | 13,800 | 4 |
| C | do | 40 | 5.5 | 12,700 | 3 |
| C | Chlorinated diphenyl ether with 46% chlorine | 20 | 4.6 | 12,900 | 3 |
| C | Poly(styrene glycol) of mol. wt. 750 | 20 | 5.0 | 12,500 | 3 |
| C | Abietic acid, methyl ester | 20 | 4.6 | 12,700 | 4 |
| C | Hydrogenated abietic acid, methyl ester | 20 | 4.7 | 12,000 | 3 |
| C | Compound X | 20 | 4.7 | 11,600 | 3 |
| D | None | 0 | 4.7 | 14,000 | |

TABLE VI—Continued

| Additive | | Wt., percent | Modulus, $10^5$ p.s.i. | Break Strength, p.s.i. | Elongation at Break, percent |
|---|---|---|---|---|---|
| D | Chlorinated biphenyl with 54% chlorine | 5 | 4.9 | 13,000 | 4 |
| D | do | 10 | 5.2 | 13,700 | 3 |
| D | do | 30 | 6.1 | 14,000 | 3 |
| D | Chlorinated terphenyl with 42% chlorine | 20 | 5.7 | 13,200 | 3 |
| D | do | 50 | 5.4 | 10,700 | 3 |
| D | Chlorinated naphthalene with 52% chlorine | 15 | 5.5 | 13,400 | 3 |
| D | Poly(stryene thioglycol) of mol wt. 1,200 | 20 | 5.6 | 13,700 | 3 |
| D | Hydrogenated abietic acid, 2,2-dimethyl-1,3-propanediol ester | 30 | 5.5 | 13,100 | 3 |
| E | None | 0 | 4.5 | 12,200 | 7 |
| E | Chlorinated biphenyl with 54% chlorine | 20 | 5.2 | 13,400 | 3 |
| E | Chlorinated phenanthrene with 48% chlorine | 15 | 5.1 | 12,900 | 3 |
| E | Poly(styrene glycol) of mol. wt. 100 | 20 | 5.1 | 13,600 | 3 |
| E | Hydroabietyl alcohol | 30 | 5.3 | 13,500 | 3 |
| E | Abietic acid, glyceryl ester | 20 | 5.4 | 13,900 | 3 |
| F | None | 0 | 3.6 | 10,100 | 8 |
| F | Chlorinated terphenyl with 32% chlorine | 20 | 4.1 | 11,400 | 5 |
| F | Chlorinated anthracene with 56% chlorine | 20 | 4.6 | 12,000 | 4 |
| F | Poly(styrene thioglycol) of mol. wt. 2,000 | 15 | 4.3 | 11,900 | 5 |
| F | Hydroabietyl acetate | 20 | 4.6 | 12,200 | 4 |
| F | Hydrogenated abietic acid, butyl ester | 15 | 4.5 | 12,700 | 4 |
| F | Diabietyl adipate | 30 | 5.0 | 13,400 | 3 |

The polycarbonate molding plastics containing antiplasticizers have increased flexural modulus (stiffness), yield strength, break strength, and hardness. Representative compositions were injection molded and tested according to Standard ASTM Procedures (ASTM D1708–59T, D747–61T and D785–51 Method A). The data exhibiting the improved properties for the respective samples is set forth in Table VI(A).

TABLE VI(A)

| Additive | | Wt., Percent | Flexural Modulus, $10^5$ p.s.i. | Yield Strength, p.s.i. | Break Strength, p.s.i. | Elong. at Break, Percent | Rockwell Hardness, L |
|---|---|---|---|---|---|---|---|
| Polycarbonate: | | | | | | | |
| A | None | 0 | 2.6 | 9,000 | 9,800 | 67 | 94 |
| A | Chlorinated terphenyl with 42% chlorine | 10 | 3.5 | 12,600 | 10,800 | 31 | 112 |
| A | Chlorinated terphenyl with 60% chlorine | 10 | 3.5 | 10,600 | 10,700 | 69 | 106 |
| A | do | 20 | 3.6 | 12,000 | 11,900 | 54 | 108 |
| A | do | 30 | 4.0 | 12,200 | 9,400 | 45 | 109 |
| A | do | 50 | 4.1 | | 10,600 | 7 | 105 |
| A | Chlorinated biphenyl with 68% chlorine | 10 | 2.9 | 11,200 | 10,700 | 58 | 105 |
| A | do | 20 | 3.6 | 12,800 | 11,900 | 66 | 111 |
| A | Hydrogenated abietic acid, triethylene glycol ester | 15 | 3.3 | | 10,000 | 8 | 104 |
| B | None | 0 | 2.7 | 10,900 | 10,100 | 35 | 113 |
| B | Chlorinated terphenyl with 60% chlorine | 20 | 3.7 | | 13,300 | 7 | 120 |

Example II

The polyesters which exhibit the improved properties when combined with the antiplasticizers of this invention are the relatively rigid polyesters defined above. In Table VII there is an exemplary listing of the starting materials for seven polyester materials which can be modified according to this invention.

TABLE VII

| Starting Materials | Inherent Viscosity |
|---|---|
| Polyester: | |
| A ........ 2,2,4,4-tetramethyl-1,3-cyclobutanediol (46% trans) and diphenyl carbonate. | 0.92 |
| B ........ 2,2,4,4-tetramethyl-1,3-cyclobutanediol (60% trans) and diphenyl carbonate. | 0.80 |
| C ........ 2,2,4,4-tetramethyl-1,3-cyclobutanediol (69% trans) and dimethyl terephthalate. | 0.83 |
| D ........ 2,4-dibutyl-2,4-diethyl-1,3-cyclobutanediol and dimethyl trans-1,4-cyclohexanedicarboxylate. | 0.72 |
| E ........ 1,4-cyclohexanediol and dimethyl 2,5-norbornanedicarboxylate. | 1.02 |
| F ........ 2,5-norbornanediol and dimethyl 2,6-naphthalenedicarboxylate. | 0.77 |
| G ........ Dispiro(5.1.5.1)tetradecane-7,14-diol and dibutyl 4,4-sulfonyldibenzoate. | 0.60 |

In Table VIII there is a listing of the above polyesters, the antiplasticizer used, the amount of antiplasticizer, and the solvent employed. In each instance a polymer dope was prepared by dissolving the polyester in the solvent and then adding the antiplasticizer. The resulting dope was used to coat a 9-inch by 18-inch glass plate using a doctor blade. The solvent was evaporated at room temperature and films 1 to 2 mils in thickness were removed and kept at room temperature overnight. The films were then heated in an oven at 100° C. for 2 to 3 hours to insure removal of all solvent. After cooling these films were employed to determine the physical properties shown in the Table VIII. Tensile modulus, tensile strength, and elongation were measured in accordance with ASTM D882–61T Method A. The heat distortion temperature (2% distortion at 50 p.s.i.) was measured in accordance with ASTM D1637–61 and Modern Plastics 34, No. 3 (1956), 169. Inherent viscosities were measured in 60/40 phenol/tetrachloroethane at a concentration of 0.23 g./100 ml.

Some of the polyesters crystallize readily when films are cast or fibers spun. Other polyesters do not crystallize under the usual conditions of casting films or spinning fibers but, if desired can be obtained in crystalline form if the solvent is evaporated slowly. This has been accomplished readily if the solvent consists of at least one component which boils between 100° C. and 250° C. and preferably between 120° C. and 180° C. Examples of such solvents are chlorobenzene, o-dichlorobenzene, anisole, cyclohexanone and acetophenone. The two component solvents are used for some of the examples in Table VIII.

TABLE VIII

| Polyester | Antiplasticizer Name | Weight Percent | Solvent | Tensile Modulus ×10⁻⁵ p.s.i. | Tensile Strength at Break, p.s.i. | Elongation at Break, Percent | Heat Distortion Temperature,°C |
|---|---|---|---|---|---|---|---|
| A | None | 0 | CHCl₃ | 2.1 | 6,800 | 13 | 133 |
| A | Chlorinated biphenyl (54% Cl) | 20 | CHCl₃ | 4.6 | 8,400 | 3 | |
| A | Chlorinated terphenyl (42% Cl) | 10 | CHCl₃ | 4.1 | 10,200 | 3 | 87 |
| A | do | 10 | 4:1 CHCl₃/C₆H₅Cl | 4.5 | 8,300 | 2 | 108 |
| A | do | 20 | 4:1 CHCl₃/C₆H₅OCH₃ | 5.2 | 7,300 | 2 | 147 |
| A | do | 30 | CH₂Cl₂ | 5.4 | 9,800 | 3 | 49 |
| A | Abietic acid, methyl ester | 20 | CH₂Cl₂ | 4.1 | 5,800 | 3 | 111 |
| A | Sucrose acetate isobutyrate | 20 | CH₂Cl₂ | 3.2 | 7,100 | 4 | 76 |
| B | None | 0 | CHCl₃ | 2.9 | 8,000 | 8 | 225 |
| B | Chlorinated terphenyl (42% Cl) | 20 | CHCl₃ | 5.5 | 9,800 | 2 | 125 |
| B | Chlorinated terphenyl (60% Cl) | 20 | CHCl₃ | 4.3 | 10,300 | 3 | |
| B | Sucrose acetate isobutyrate | 20 | CHCl₃ | 3.9 | 8,100 | 4 | |
| B | Poly(styrene glycol) of mol. wt. 500 | 15 | CHCl₃ | 3.8 | 8,400 | 4 | |
| B | Hydrogenated abietic acid, triethylene glycol ester | 15 | 5:1 CHCl₃/C₆H₅COCH₃ | 4.4 | 7,900 | 3 | 172 |
| B | Abietyl alcohol | 20 | CHCl₃ | 4.0 | 9,400 | 4 | |
| C | None | 0 | 4:1 CHCl₃/CF₃COOH | 2.2 | 8,300 | 15 | 206 |
| C | Chlorinated biphenyl (54% Cl) | 20 | 4:1 CHCl₃/CF₃COOH | 3.9 | 10,200 | 3 | 88 |
| C | Chlorinated terphenyl (42% Cl) | 20 | 4:1 CHCl₃/CF₃COOH | 3.9 | 10,700 | 3 | 90 |
| C | Chlorinated terphenyl (60% Cl) | 20 | 4:1 CHCl₃/CF₃COOH | 3.8 | 10,500 | 3 | 121 |
| C | do | 20 | 4:1 CHCl₃/CF₃COOH/C₆H₅OCH₃ | 4.5 | 9,700 | 2 | 150 |
| C | Chlorinated anthracene (56% Cl) | 10 | 4:1 CHCl₃/CF₃COOH | 3.2 | 9,400 | 5 | |
| C | Abietic acid, methyl ester | 20 | 4:1 CHCl₃/CF₃COOH | 3.9 | 10,300 | 4 | 107 |
| C | Poly(styrene glycol) of mol. wt. 1500 | 20 | 8:2:1 CHCl₃/CF₃COOH/o-C₆H₄Cl₂ | 3.8 | 9,200 | 3 | 162 |
| D | None | 0 | CHCl₃ | 2.0 | 6,900 | 20 | |
| D | Chlorinated biphenyl (54% Cl) | 20 | CHCl₃ | 3.8 | 8,800 | 3 | |
| D | Chlorinated terphenyl (42% Cl) | 20 | CHCl₃ | 4.1 | 9,000 | 3 | |
| D | Chlorinated phenanthrene (48% Cl) | 15 | CHCl₃ | 3.7 | 7,800 | 3 | |
| D | Hydroabietyl acetate | 20 | CHCl₃ | 3.5 | 8,000 | 4 | |
| E | None | 0 | 4:1 CHCl₃/CF₃COOH | 2.5 | 7,200 | 17 | |
| E | Chlorinated biphenyl (32% Cl) | 25 | 4:1 CHCl₃/CF₃COOH | 3.6 | 8,400 | 4 | |
| E | Chlorinated biphenyl (68% Cl) | 20 | 4:1 CHCl₃/CF₃COOH | 4.0 | 8,900 | 3 | |
| E | Chlorinated naphthalene (52% Cl) | 10 | 4:1 CHCl₃/CF₃COOH | 3.3 | 8,000 | 4 | |
| E | Diabietyl adipate | 20 | 4:1 CHCl₃/CF₃COOH | 4.1 | 8,800 | 3 | |
| E | Abietic acid, glyceryl ester | 15 | 4:1 CHCl₃/CF₃COOH | 3.9 | 9,000 | 3 | |
| E | Glucose acetate propionate | 20 | 4:1 CHCl₃/CF₃COOH | 3.8 | 8,400 | 3 | |
| F | None | 0 | 4:1 CHCl₃/CF₃COOH | 3.1 | 8,400 | 15 | |
| F | Chlorinated terphenyl (54% Cl) | 20 | 4:1 CHCl₃/CF₃COOH | 4.3 | 10,700 | 3 | |
| F | Chlorinated diphenyl ether (46% Cl) | 15 | 4:1 CHCl₃/CF₃COOH | 4.0 | 9,900 | 3 | |
| F | Hydrogenated abietyl acetate | 20 | 4:1 CHCl₃/CF₃COOH | 4.2 | 10,200 | 3 | |
| F | Poly(styrene thioglycol) of mol. wt. 400 | 20 | 4:1 CHCl₃/CF₃COOH | 4.1 | 9,700 | 3 | |
| G | None | 0 | CHCl₃ | 2.4 | 6,400 | 19 | |
| G | Chlorinated biphenyl (54% Cl) | 15 | CHCl₃ | 3.6 | 8,700 | 3 | |
| G | Chlorinated diphenylmethane (58% Cl) | 10 | CHCl₃ | 3.2 | 7,800 | 4 | |
| G | Poly(styrene glycol) of mol. wt. 750 | 15 | CHCl₃ | 3.0 | 7,600 | 4 | |
| G | Hydrogenated abietic acid, butyl ester | 10 | CHCl₃ | 3.0 | 7,500 | 4 | |
| G | Hydrogenated abietic acid, 2,2-dimethyl-1,3-propanediol ester | 20 | CHCl₃ | 3.7 | 8,600 | 3 | |
| G | Sucrose acetate propionate | 20 | CHCl₃ | 3.4 | 8,100 | 3 | |
| G | Compound IX | 20 | CHCl₃ | 3.5 | 8,800 | 3 | |
| F | Compound VIII | 20 | 4:1 CHCl₃/TFA | 4.3 | 10,900 | 3 | |
| D | Compound VI | 20 | CHCl₃ | 2.8 | 7,400 | 8 | |
| D | Compound VII | 20 | CHCl₃ | 3.9 | 8,700 | 3 | |
| C | Compound V | 20 | 4:1 CHCl₃/TFA | 4.6 | 9,800 | 3 | |
| B | do | 20 | CHCl₃ | 4.4 | 9,300 | 3 | |
| B | Compound III | 20 | CHCl₃ | 4.3 | 8,800 | 3 | |
| B | Compound VII | 20 | CHCl₃ | 4.2 | 8,700 | 4 | |
| A | Compound I | 20 | CH₂Cl₂ | 4.6 | 8,100 | 3 | |
| A | Compound II | 20 | CH₂Cl₂ | 4.5 | 7,900 | 3 | |

Example III

Tests were performed on polyester molding plastics containing antiplasticizers in accordance with this invention. In Table IX the various properties are shown, indicating the increases in property values obtained when antiplasticizers were employed. The properties in Table IX were determined on injection-molded polymers according to standard ASTM procedures (ASTM D1708–59T D747–61T, and D785–51 Method A). The antiplasticizers, dissolved in acetone or cyclohexane, were deposited on 10 to 20-mesh polyester particles in an evaporating dish by allowing the solvent to evaporate while the mixture was stirred and warmed gently. The particles were then stirred in a flask while heating in a bath at 100° C. for 2 hours to remove last traces of solvent and to permit the additive to penetrate the particles. These particles were then molded into the test specimens.

TABLE IX

| Polyester | Antiplasticizer Name | Wt. Percent | Flexural Modulus ×10⁻⁵ p.s.i. | Yield Strength, p.s.i. | Break Strength, p.s.i. | Elongation at Break, % | Rockwell Hardness, L |
|---|---|---|---|---|---|---|---|
| A | None | 0 | 2.0 | 5,900 | 6,300 | 49 | 78 |
| A | Chlorinated terphenyl (42% Cl) | 5 | 2.6 | 7,000 | 6,600 | 41 | 96 |
| A | do | 10 | 3.1 | | 8,700 | 8 | 101 |
| A | Chlorinated terphenyl (60% Cl) | 30 | 3.4 | | 8,900 | 7 | 98 |
| A | Chlorinated biphenyl (68% Cl) | 5 | 2.5 | 6,600 | 6,400 | 47 | 93 |
| A | Hydrogenated abietic acid, triethylene glycol ester | 10 | 3.0 | | 6,000 | 5 | 95 |
| B | None | 0 | 2.6 | 6,900 | 6,500 | 30 | 80 |
| B | Chlorinated terphenyl (42% Cl) | 5 | 3.2 | 8,000 | 7,500 | 15 | 99 |
| B | Chlorinated biphenyl (54% Cl) | 10 | 3.6 | | 8,800 | 5 | 103 |
| C | None | 0 | 2.1 | | 5,600 | 5 | 101 |
| C | Chlorinated terphenyl (42% Cl) | 20 | 4.0 | | 12,800 | 7 | 120 |

The invention has been described in considerable detail with particular reference to certain preferred embodiments thereof, but it will be understood that variations and modifications can be effected within the spirit and scope of this invention as described here and above and as defined in the appended claims.

We claim:
1. A thermoplastic composition comprising from about 98% to about 50% by weight of a thermoplastic polymer selected from the group consisting of polyesters resulting from the condensation of an alicyclic secondary diol of from 4 to 14 carbon atoms and a member of the group consisting of aromatic dicarboxylic acids, alicyclic dicarboxylic acids, carbonic acid, and the esterifiable derivatives of said acids; and from about 2% to about 50% by weight of an antiplasticizer compound selected from the group consisting of polystyrene thioglycols having molecular weights from 440 to 3400, chlorinated aromatic polynuclear hydrocarbons containing from 30% to 75% nuclear chlorine, abietyl alcohol, hydrogenated abietyl alcohol, mono and diesters from condensation of unsaturated and hydrogenated abietyl alcohols with monocarboxylic and dicarboxylic acids having up to 19 carbon atoms, said antiplasticizer being further characterized by (1) containing at least 2 nonbridged rings containing from 4 to 8 carbon atoms wherein said rings are either carbocyclic or heterocyclic rings, (2) containing at least one atom selected from the group consisting of halogen, oxygen, nitrogen, and sulfur, (3) having in at least 65% of the length of its molecule one cross-sectional dimension less than about 5.5 angstrom units, and (4) having a glass transition temperature of greater than $-50°$ C.

2. A thermoplastic composition comprising from about 98% to about 50% by weight of a thermoplastic polymer selected from the group consisting of polyesters resulting from the condensation of an alicyclic secondary diol of from 4 to 14 carbon atoms and a member of the group consisting of aromatic dicarboxylic acids, alicyclic dicarboxylic acids, carbonic acid, and the esterifiable derivatives of said acids; and from about 2% to about 50% by weight of an ester of abietic acid as an antiplasticizer compound, said antiplasticizer compound being further characterized by (1) containing at least 2 nonbridged rings containing from 4 to 8 carbon atoms wherein said rings are either carbocyclic or heterocyclic rings, (2) containing at least one atom selected from the group consisting of halogen, oxygen, nitrogen, and sulfur, (3) having in at least 65% of the length of its molecule one cross-sectional dimension less than about 5.5 angstrom units, and (4) having a glass transition temperature of greater than $-50°$ C.

3. A thermoplastic composition comprising from about 98% to about 50% by weight of a thermoplastic polymer selected from the group consisting of polyesters resulting from the condensation of an alicyclic secondary diol of from 4 to 14 carbon atoms and a member of the group consisting of aromatic dicarboxylic acids, alicyclic dicarboxylic acids, carbonic acid, and the esterifiable derivatives of said acids; and from about 2% to about 50% by weight of abietyl alcohol as an antiplasticizer compound.

References Cited

UNITED STATES PATENTS

| 3,254,047 | 5/1966 | Caldwell et al. | 260—33.2 |
| 3,240,735 | 3/1966 | Caldwell et al. | 260—26 |
| 3,186,961 | 6/1965 | Sears | 260—30.5 |
| 2,968,639 | 1/1961 | Caldwell et al. | 260—33.8 |

FOREIGN PATENTS 388,576  6/1963  Japan.

OTHER REFERENCES

Christopher et al., Polycarbonates, Reinhold Publishing Corp., Feb. 6, 1962, pp. 135, 136, 147, 148, 149 and 159 relied upon, available in Scientific Lib., call No. TP 156.P6.

DONALD E. CZAJA, *Primary Examiner.*

L. J. BERCOVITZ, *Examiner.*

F. McKELVEY, *Assistant Examiner.*